March 1, 1966  B. E. MIDDLETON  3,237,275
CUTTING TOOLS

Filed Dec. 12, 1963  2 Sheets-Sheet 1

INVENTOR.
BURTON E. MIDDLETON
BY Morris Michael Marks
ATTORNEY

March 1, 1966     B. E. MIDDLETON     3,237,275
CUTTING TOOLS
Filed Dec. 12, 1963     2 Sheets-Sheet 2
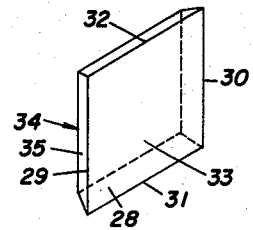
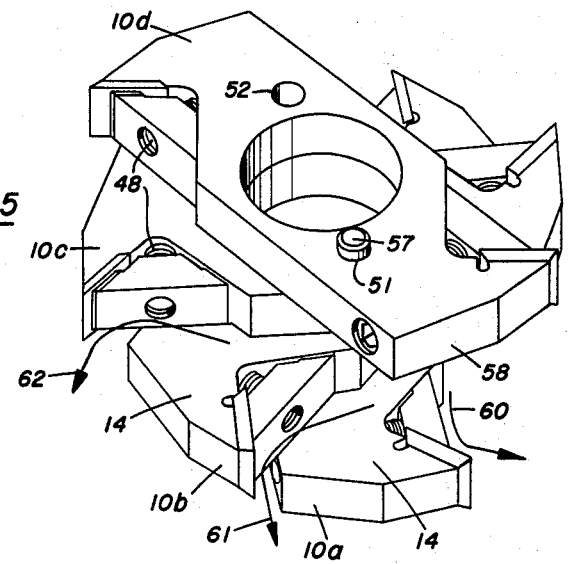
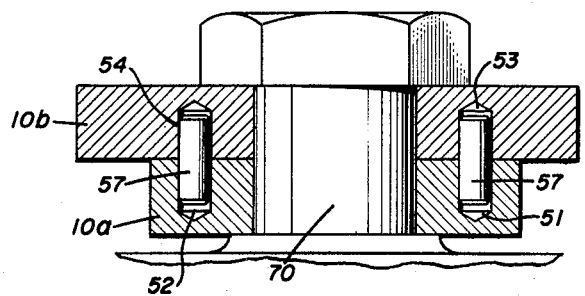
INVENTOR.
BURTON E. MIDDLETON
ATTORNEY

3,237,275
CUTTING TOOLS
Burton E. Middleton, 1957 Acorn Lane, Abington, Pa.
Filed Dec. 12, 1963, Ser. No. 330,048
17 Claims. (Cl. 29—105)

My invention relates to cutting tools, and it relates more particularly to tools adapted for use in cutting such materials as wood, plastics, or light metals such as aluminum or magnesium alloys.

Such cutting tools require for their efficient use special materials such as cutting ceramics or metal alloys such as high carbon steel or tungsten carbide, in order to retain their sharpness at the elevated temperatures generated by the high speed contact with the material being worked by the tool. When such cutting edges are worn, resharpening is required, thereby withdrawing the tool from use, and requiring skilled labor to sharpen the tool with the required precision. In order to avoid this result, tools have been designed, using discardable inserts. However, such inserts have generally been limited to one or two cutting edges, and the clamping mechanism has often necessitated such cumbersome construction as to impair the efficiency of the tool.

Moreover, for optimum performance it is essential that the elevated temperatures occasioned by the use of such tools at high speeds, be dissipated quickly and efficiently, for failure to do so could result not only in reduction of efficiency, and damage to the cutting edge, but in injury to the material worked upon. Yet at high speed cuttting, not only has it been difficult to prevent the accumulation of heat in the product worked upon, but accumulations of chips, powdery residue, glues, resins and the like on or about the cutting tool have served to reduce efficient rake and clearance, and also to provide an insulator impeding the dissipation of heat from the tool and thus aid in increasing the temperature.

Furthermore, although a high cutting rake is very desirable for optimum cutting action in high speed cutting of such materials, because of the brittle nature of tungsten carbide and ceramincs it has been necessary to reduce the cutting rake below the angle requisite for most efficient cutting of the material.

One object of my invention therefore is to provide a high velocity cutting tool which utilizes cutter inserts and which is self-cooling.

Another object of my invention is to provide a high velocity cutting tool which is adapted to dissipate heat from the material worked upon during the high speed cutting operation.

A further object of my invention is to provide a high velocity cutting tool utilizing cutter inserts, which is so constructed as to be self-cleaning, and which contains substantially no pockets which could accumulate chips or dust which would hinder the dissipation of heat from the tool.

Another object of my invention is to provide a high speed cutting tool having cutter inserts which is so constructed as to avoid the necessity for adjustment of the cutting edge.

A further object of my invention is to provide such a tool which is so constructed as to transmit operating forces through the insert in a manner to protect the insert against destructive stresses and strains.

Another object of my invention is to provide such a tool, having means for readily locking the inserts in place in a manner to assure the proper location thereof, and as readily to release said inserts when it is desired to change the cutting edge.

A further object of my invention is to provide such a tool which is so constructed as to provide for the use of inserts having four cutting edges available for utilization in any desired sequence, said construction assuring the proper location of each such cutting edge.

Another object of my invention is to provide such a tool with means whereby a plurality of cutting heads may readily be mounted on an arbor in predetermined angular displacement with respect to each other so as to assure proper setting on said arbor and with a minimum of labor.

Other objects will appear from the more detailed description which follows.

For the purpose of illustrating my invention, I have shown in the accompanying drawings forms thereof which are at present preferred by me, since the same have been found to give satisfactory and reliable results, although it is to be understood that the various instrumentalities of which my invention consists can be variously arranged and organized, and that my invention is not limited to the precise arrangements and organizations of the instrumentalities as herein shown and described.

Referring now to the drawings in which like reference characters indicate like parts:

FIGURE 4 represents a perspective view of a cutter insert adapted to be used in the cutting tool of my invention.

FIGURE 5 represents a perspective view of a cutting tool comprising an assembly of cutting heads, and embodying my invention.

FIGURE 6 represents a vertical sectional view of another assembly of cutting heads and embodying my invention.

Figure 1:
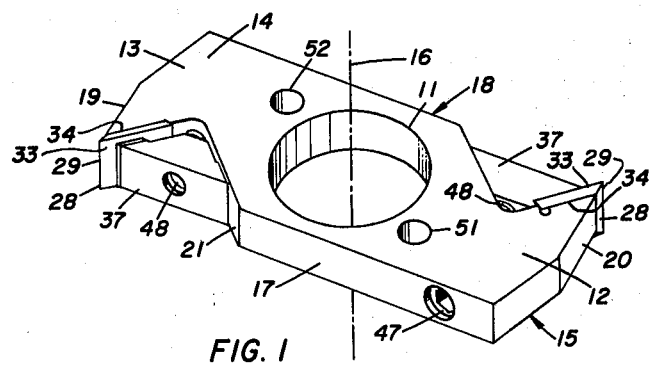
FIGURE 1 represents a perspective view of a cutting head of a cutting tool embodying my invention.
Figure 2:
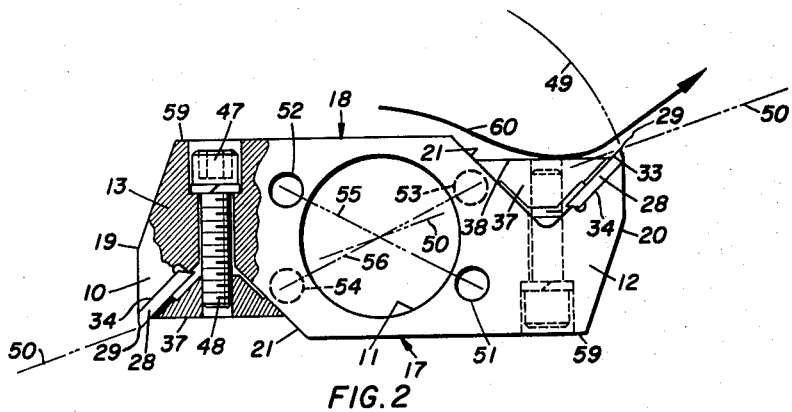
FIGURE 2 represents a plan view of the cutting edge illustrated in FIGURE 1.
Figure 3:
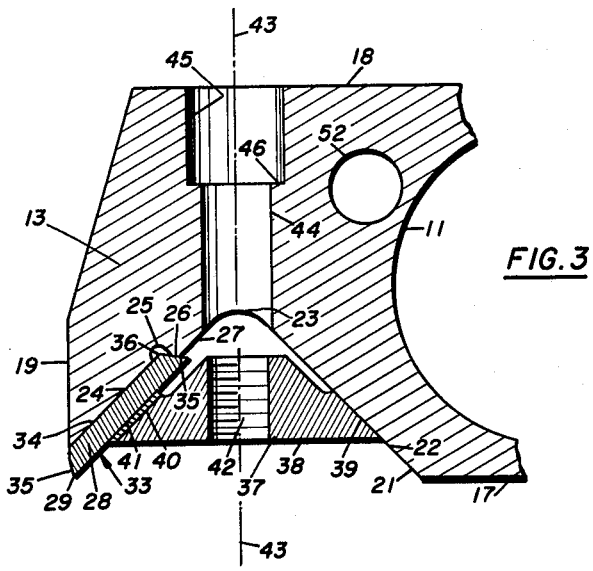
FIGURE 3 represents an enlarged sectional view of one end of the cutting head illustrated in FIGURE 2.

According to my invention I provide a cutter head 10 comprising a collar portion 11 and preferably two oppositely disposed cutting arm regions 12 and 13.

The cutter head 10 preferably comprises a flat upper face 14 and a parallel, flat, lower face 15, said upper and lower faces 14 and 15 being normal to the longitudinal axis 16 of the collar 11. A forward face 17 and a parallel rearward face 18 extend between the upper and lower faces 14 and 15, perpendicular thereto, and equidistant from the longitudinal axis 16. The opposed outer edges 19 and 20 extending between the forward and rearward faces 17, 18, and upper and lower faces 14 and 15 are disposed substantially equidistant from the longitudinal axis 16 and are preferably shaped about an arc or tangents to an arc centered about said longitudinal axis 16.

A forward face 17 is recessed at one end region 21 thereof. The recess 21 is preferably substantially V-shaped, and comprises a step bearing surface 22 rearwardly inclined from the forward face 17, and extending toward the vertex region 23 of the recess 21. A bed 24 is inclined rearwardly from the outer edge 19 toward the vertex region 23 and preferably terminates in an undercut 25 disposed between the bed 24 and a seat 26. A wall 27 may extend from the seat 26 toward the vertex region 23. In a preferred form, the angle between the bed 24 and the step bearing surface 22 is substantially ninety degrees.

A cutter insert 28 is provided, preferably having parallel cutting edges 29 and 30, and parallel cutting edges 31 and 32 disposed perpendicular thereto, said cutting edges 29, 30, 31 and 32 being disposed about a forward or obverse face 33. A rearward or reverse face 34 is disposed parallel to the forward or obverse face 33 and extends between the bevelled surfaces 35 extending rearwardly from the cutting edges 29, 30, 31 and 32. The cutter insert 28 is preferably formed of suitable high velocity cutting material such for instance as tungsten carbide, high speed steel, or cutting ceramics.

The bed 24 is preferably carefully machined to provide a flush platen for substantially all of the rearward or reverse face 34 of the cutter insert 28. The seat 26 is disposed at an angle to the bed 24 substantially equal to the angle between the bevelled surface 35 and the rearward or reverse face 34 of the cutter insert 28. The juncture 36 of the angle formed by the seat 26 and bed 24 is preferably disposed along the bed 24 a distance from the outer edge 19 slightly less than the distance between opposed bevel edges 35 along the rearward face 34 of the cutter insert 28; and the wall 27 is disposed along the seat 26 a distance from the bed 24 preferably less than the distance between the rearward or reverse face 34 and forward or obverse face 33 along the bevelled edge 35 of the cutter insert 28.

A wedge shaped clamp member 37 is preferably provided with a forward wall 38, a rearwardly inclined shoe portion 39 and a rearwardly inclined jaw portion 40 disposed at an angle to the shoe portion 39 substantially equal to the angle between the bed 24 and the step bearing surface 22. A yieldable lining 41, preferably of a soft metal such for instance as copper, may be mounted on the jaw portion 40 in a manner to bear against the cutter insert 28, across the middle region thereof when said insert is resting in place against the bed 24 and seat 26.

The wedge shaped clamp member 37 is tapped as at 42 along an axis 43 substantially perpendicular to the rearward face 18. A bore 44 is disposed about said axis 43 in the cutting arm region 13, said bore 44 being counterbored as at 45 to form a step bearing 46 for the head 47 of a drawbolt 48 threadedly secured to the wedge shaped clamp member 37.

In a preferred form, the cutting arm regions 12 and 13 are formed substantially identical and are similarly related to cutter inserts 28. There is thus defined a cutting circle disposed about the arc 49 and having an effective plane 50 disposed along the diameter of the circle 49 and defined by the cutting edges 29 of the cutter inserts 28 mounted in the cutting arm regions 12 and 13. The rake of the cutting edge 29 may thus be disposed at the most efficient angle for cutting, as for instance 25° for cutting most woods.

In a preferred form, dowel-holes 51 and 52 are formed respectively in the cutting arm regions 12 and 13 through one face 14 thereof; and dowel-holes 53 and 54 are disposed respectively in said cutting arm regions 12 and 13 through the opposed face 15 thereof. The dowel-holes 53 and 54 form a pattern with the central axis 16 of the cutting head 10 which is substantially identical to the pattern formed by the dowel-holes 51, 52 and said longitudinal axis 16, but are disposed about said longitudinal axis 16 at an angle with respect to the disposition of said dowel-holes 51, 52. Thus for instance, the dowel-holes 51, 52 may be formed along a diameter 55, and the dowel-holes 53, 54 may be formed along a diameter 56. In a preferred form, the diameters 55 and 56 are disposed at an angle which varies from a prime divisor of 360°. Thus for instance, when such an angle is 21° and similar cutting heads 10a, 10b, 10c and 10d are mounted with their collar regions 11 disposed about a suitable spindle 70, and dowel pins 57 disposed between adjacent cutting heads and through the dowel-holes 53, 54 extending through the lower face 15, and dowel-holes 51, 52 extending through the upper face 14 of said adjacent cutting heads, the cutting edges 29 will be staggered about the array of cutting heads at angles about a full 360° which at no point duplicate any previously occupied angle. In this manner, high speed rotation of the cutting tool 58 consisting of said array of cutting heads, will be free of rhythmic beats occasioned by the augmenting of cutting forces resulting from the intermittent simultaneous application of plural cutting edges against the work.

In operation, the rotation of the cutting head causes each of the forward and rearward faces 17, 18 to swing about an arc having the longitudinal axis 16 as its center. The portion of each face 17, 18 which includes the recess 21 is advancing, while the opposed portion 59 is retreating. As the cutting edge 29 penetrates the material being worked, the cut material, whether in the form of chips, powder, shavings, or otherwise, tends to be cammed away from the cutting edge 29 and along the sharply inclined forward face 33 of the cutter insert 28, and from thence along the forward wall 38 of the wedge shaped clamp member 37. In the process however, air rushes in to fill the vacuum occasioned by the retreating portion 59 of the face 17, 18, and is compressed by the advancing portion including the forward wall 38 and inclined forward face 33. This air thus flows in a stream which may be as indicated at 60 which is adapted to dislodge the cut material from the cutting head and carry it away from the tool. In this action the releasing of the material is augmented by centrifugal force. Thus, the cutting head and cutter insert are self-cleaning, and at the same time are air cooled. Moreover, there is no place where cut material can lodge against the cutting head or insert and thereby hinder the required cooling action. And the stream of air 60 being directed outwardly, it strikes the material being cut, aiding substantially in the cooling thereof.

When an array of cutting heads 10a, 10b, 10c, etc. is mounted on a spindle in the form of a helix, particular by means of the dowel and dowel-hole combination of my invention, as for instance illustrated in FIGURE 5, the upper portion of the air stream 60 established by the rotation of the lowermost cutter head 10a is allowed to expand above the upper face 14 of that cutter head, and this portion of the air stream 60 is compressed against the air stream 61 established by the rotation of the cutter head 10b about the spindle 70. In like manner, the upper portion of the thus combined air stream 61 and the upper portion of the air stream 60 is allowed to expand above the upper face 14 of the next succeeding cutting head 10b and to combine with the air stream 62 established by the rotation of the cutting head 10c, and so on with respect to each succeeding cutting head. In this manner, air pressure is built up in an upward direction as well as outward from the spiral assembly of cutting heads. The resultant air flow carries with it the chips, shavings, powdery residue and the like which the cutting edges 29 remove from the material worked upon, and the thus removed material is carried upwardly and outwardly away from the tool, further assuring freedom from accumulation of deposits on the tool. Not only so, but the rapid passage of air across and about the cutting head of the cutter insert, with virtually no obstruction or dead air pockets to impede such passage, serves to make the cutting tool self-cooling; and the impinging of the outward flow of air against the material worked upon serves to cool the material and this reduces the possibility of damage due to heat.

The copper lining 41 further aids in the cooling of the cutter insert 28. Being disposed across the middle of the insert, and conveying the full pressure of the wedge shaped clamp member 37 against said cutter insert, the yieldable copper lining is pressed into full contact against the cutter insert; and being a good conductor of heat, it transmits heat away from the cutter insert 28 and to the edge wedge shaped clamp member 37.

In addition, the copper lining dampens the shock effect imposed by the cutting edge 29 striking against the material worked upon at each cutting thrust. Also, yieldable lining being pressed into full contact with the cutter insert 28, the tendency of the cutter insert to chatter is markedly reduced or eliminated, thereby decreasing the possibility of fragmentation of the brittle cutting edge 29. Additionally, because of the greater frictional hold of the yieldable lining 41 upon the cutter insert 28, the possibility of displacement of the cutter insert is reduced or eliminated.

The use of a wedge shaped clamp member having a jaw inclined at a substantial angle to the forward wall 38, and a bed 24 disposed at a similar angle, allows the cutter insert 28 to be disposed at a high rake while virtually eliminating bending or shearing forces across said cutter insert; and at the same time provides for a camming of the cutaway materials across the forward face 33 of the cutter insert and onto and along the forward wall 38 of the clamp member 37. The step bearing 22 being inclined substantially at a complementary angle to that of the jaw 40, the cutaway materials are prevented from being deposited in any pocket formed between the forward wall 38 and the step bearing 22. Thus the recess 21 which contains the cutter insert 28 and the means for holding the same in place, is kept substantially free of deleterious deposits.

When the cutting edge 29 becomes dull, it is merely necessary to turn the bolt 47 sufficiently to release the clamping action of the wedge shaped clamp member 37, and to turn the cutter insert 28 until another bevelled edge 35 rests flush against the seat 26 while the rearward or reverse face 34 rests against the bed 24, and then to tighten the bolt 47 thereby disposing another cutting edge 30, 31 or 32 in place.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:

1. A high velocity cutting tool comprising:
   a cutting arm having a forward face, a rearward face and an outer edge;
   a wedge-shape recess formed in said forward face at said outer edge, said recess comprising:
      a step bearing surface leading toward the vertex of said recess,
      a bed extending from said outer edge substantially toward said vertex, and disposed at a substantial angle to said forward face,
      a seat disposed between said bed and said vertex;
   a substantially wedge shaped clamp member having
      a forward wall,
      a shoe portion extending rearwardly from said forward wall and adapted to bear against said step bearing surface,
      an oppositely disposed jaw portion, and
      a tap intermediate said shoe and jaw portions;
   a bore extending through said rearward face and said vertex, and aligned with said tap when said clamp member is disposed in said recess with said shoe portion bearing against said step bearing;
   a bolt having
      a head adapted to bear against a portion of said cutting arm, and
      a shank comprising a thread adapted to engage said tap and draw said clamp member toward said vertex in a manner to draw said jaw portion against a cutter insert resting upon said bed and said seat with a cutting edge disposed beyond said outer edge.

2. A high velocity cutting tool as defined in claim 1, and further characterized by:
   said cutting arm comprising a second outer edge having a recess related thereto in substantially the same manner as the first-mentioned recess is related to the first-mentioned outer edge;
   said forward face extending from said first-mentioned recess substantially to said second outer edge, and being substantially smooth and continuous.

3. A high velocity cutting tool as defined in claim 1, and further characterized by:
   a yieldable lining disposed on said jaw and adapted to bear against said cutter insert.

4. A high velocity cutting tool as defined in claim 1, and further characterized by:
   said cutting edge being disposed at a high rake.

5. A cutting tool comprising a plurality of cutting heads,
   each cutting head having:
      an upper face and a lower face, a collar portion having a longitudinal axis, and means for holding a cutting device;
   a dowel-hole disposed through said upper face of one of said cutting heads, and defining with said longitudinal axis and said cutting device an angle whose vertex is said axis;
   a dowel-hole disposed through said lower face of another of said cutting heads, and defining with said longitudinal axis and the cutting device of said last-mentioned cutting head an angle whose vertex is said axis,
      said last-mentioned angle being non-complementary to said first-mentioned angle with respect to a prime divisor of 360°; and
   a dowel adapted to be disposed in both of said dowel-holes when said upper and lower faces are adjacent one another and said collar portions are mounted on a spindle which itself is disposed about said longitudinal axis.

6. A cutting tool comprising a plurality of cutting heads, each cutting head having:
   an upper face and lower face, a collar portion having a longitudinal axis;
   a cutting arm having a forward face, a rearward face and an outer edge;
   a wedge-shape recess formed in said forward face at said outer edge, said recess comprising:
      a step bearing surface leading toward the vertex of said recess,
      a bed extending from said outer edge substantially toward said vertex, and disposed at a substantial angle to said forward face,
      a seat disposed between said bed and said vertex;
   a substantially wedge shaped clamp member having
      a forward wall,
      a shoe portion extending rearwardly from said forward wall and adapted to bear against said step bearing surface,
      an oppositely disposed jaw portion, and
      a tap intermediate said shoe and jaw portions;
   a bore extending through said rearward face and said vertex, and aligned with said tap when said clamp member is disposed in said recess with said shoe portion bearing against said step bearing;
   a bolt having:
      a head adapted to bear against a portion of said cutting arm, and
      a shank comprising a thread adapted to engage said tap and draw said clamp member toward said vertex in a manner to draw said jaw portion against a cutter insert resting upon said bed and said seat with a cutting edge disposed beyond said outer edge;
   a dowel-hole disposed through said upper face of one of said cutting heads, and defining with said longitudinal axis and said cutting edge an angle whose vertex is said axis;
   a dowel-hole disposed through said lower face of another of said cutting heads, and defining with said longitudinal axis and the cutting edge of said last-mentioned cutting head an angle whose vertex is said axis, said last-mentioned angle being non-complementary to said first-mentioned angle with respect to a prime divisor of 360°; and a dowel adapted to be disposed in both of said dowel-holes when said upper and lower faces are adjacent one another and said collar portions are mounted on a spindle which itself is disposed about said longitudinal axis.

7. A cutting tool comprising a plurality of cutting heads, each cutting head having:

an upper face and lower face, and a collar portion having a longitudinal axis;

a cutting arm having a forward face, a rearward face and an outer edge;

a wedge-shape recess formed in said forward face at said outer edge, said recess comprising:

a step bearing surface leading toward the vertex of said recess, a bed extending from said outer edge substantially toward said vertex, and disposed at a substantial angle to said forward face, a seat disposed between said bed and said vertex;

a substantially wedge shaped clamp member having a forward wall, a shoe portion extending rearwardly from said forward wall and adapted to bear against said step bearing surface, an oppositely disposed jaw portion, and a tap intermediate said shoe and jaw portions;

a bore extending through said rearward face and said vertex, and aligned with said tap when said clamp member is disposed in said recess with said shoe portion bearing against said step bearing;

a bolt having:

a head adapted to bear against a portion of said cutting arm, and a shank comprising a thread adapted to engage said tap and draw said clamp member toward said vertex in a manner to draw said jaw portion against a cutter insert resting upon said bed and said seat with a cutting edge disposed beyond said outer edge;

said cutting arm comprising a second outer edge having a recess related thereto in substantially the same manner as the first-mentioned recess is related to the first-mentioned outer edge;

said forward face extending from said first-mentioned recess substantially to said second outer edge, and being substantially smooth and continuous;

a yieldable lining disposed on said jaw and adapted to bear against said cutter insert;

said cutting edge being disposed at a high rake;

a dowel-hole disposed through said upper face of one of said cutting heads, and defining with said longitudinal axis and said cutting edge an angle whose vertex is said axis;

a dowel-hole disposed through said lower face of another of said cutting heads, and defining with said longitudinal axis and the cutting edge of said last-mentioned cutting head an angle whose vertex is said axis, said last-mentioned angle being non-complementary to said first-mentioned angle with respect to a prime divisor of 360°; and a dowel adapted to be disposed in both of said dowel-holes when said upper and lower faces are adjacent one another and said collar portions are mounted on a spindle which itself is disposed about said longitudinal axis.

8. A high velocity cutting tool comprising a plurality of cutting heads, each cutting head having:

an upper face, a lower face, a collar portion having a longitudinal axis, a forward face, a cutter insert portion at one edge of said forward face, a recess disposed at the opposed portion of said forward face, said recess comprising:

an outer edge, a bed extending from said outer edge toward said first-mentioned edge, and at a substantial angle to said forward face, a clamp member having a forward wall, and a jaw portion adapted to bear against a cutter insert disposed on said bed, in a manner to dispose said forward wall at a substantial obtuse angle to said cutter insert, said forward face and said forward wall being so disposed with respect to each other as to be substantially free of obstructions which would hinder the flow of an air stream along said forward face and forward wall during the cutting operation of said tool;

a dowel-hole disposed through said upper face of one of said cutting heads, and defining with said longitudinal axis and said cutting device an angle whose vertex is said axis;

a dowel hole disposed through said lower face of another of said cutting heads, and defining with said longitudinal axis and the cutting device of said last-mentioned cutting head an angle whose vertex is said axis, said last-mentioned angle being non-complementary to said first-mentioned angle with respect to a prime divisor of 360°; and a dowel adapted to be disposed in both of said dowel-holes when said upper and lower faces are adjacent one another and said collar portions are mounted on a spindle which itself is disposed about said longitudinal axis.

9. In combination, a high velocity rotary cutting tool, and a cutter insert;

said cutter insert comprising:

an obverse face, a reverse face, a periphery intermediate said obverse face and reverse face, a plurality of sequentially operable cutting edges disposed along the intersection of said periphery and said obverse face;

said high velocity rotary cutting tool comprising:

a cutting arm having an axis of rotation, and an outer portion;

a recess disposed in the vicinity of said outer portion, said recess comprising:

a bed adapted to cover a substantial portion of said reverse face, and a seat disposed parallel to said axis of rotation, and adapted to bear against a portion of said periphery and thereby to project a cutting edge of said cutter insert into operable cutting position, and sequentially to bear against another portion of said periphery and thereby to project another of said cutting edges into operable cutting position;

a clamp member carried by said cutting arm and adapted to be advanced toward said bed in a direction tangential to an arc disposed about said axis, operably to clamp said cutter insert between said clamp member and said bed.

10. A high velocity rotary cutting tool comprising:
a cutting arm having a forward face, a rearward face and an outer edge;
a wedge-shaped recess formed in said forward face at said outer edge, said recess comprising:
   a bearing surface,
   a bed extending substantially from said outer edge and disposed at a substantial angle to said forward face,
   said bearing surface and said bed defining an angle having a vertex,
   a seat disposed between said bed and said vertex;
a substantially wedge-shaped clamp member having
   a forward wall,
   a shoe portion extending rearwardly from said forward wall and adapted to bear against said bearing surface,
   an oppositely disposed jaw portion, and
   means to draw said clamp member toward said vertex, operably to urge said shoe portion against said bearing surface and said jaw portion toward said bed;
said jaw portion and said bed being adapted to hold therebetween a cutter insert having an obverse face, a reverse face, a plurality of edge portions extending therebetween, and a cutting edge between one of said edge portions and said obverse face;
said seat being adapted to bear against another of said cutter insert edge portions in a manner to project said cutting edge beyond said forward wall of said wedge-shaped clamp member; and
said bed being adapted to bear against substantially all of said reverse face when said cutter insert is thus held between said jaw portion and said bed, and said seat bears against said another of said edge portions in a manner to project said cutting edge beyond said forward wall.

11. A high velocity rotary cutting tool as defined in claim 10, and further characterized by:
said cutting arm comprising a second outer edge having a recess related thereto in substantially the same manner as the first-mentioned recess is related to the first-mentioned outer edge;
said forward face extending from said first-mentioned recess substantially to said second outer edge, and being substantially smooth and continuous.

12. A high velocity rotary cutting tool as defined in claim 10, and further characterized by:
a yieldable lining disposed on said jaw and adapted to bear against said cutter insert.

13. A high velocity rotary cutting tool as defined in claim 10, and further characterized by:
said cutting edge being disposed at a high rake.

14. A cutting tool comprising a plurality of cutting heads
each cutting head having:
   a collar portion having a longitudinal axis,
   an upper face and a lower face,
   a forward face, a rearward face and an outer edge;
a wedge-shaped recess formed in said forward face at said outer edge, said recess comprising:
   a bearing surface,
   a bed extending substantially from said outer edge and disposed at a substantial angle to said forward face,
   said bearing surface and said bed defining an angle having a vertex,
   a seat disposed between said bed and said vertex;
a substantially wedge-shaped clamp member having
   a forward wall,
   a shoe portion extending rearwardly from said forward wall and adapted to bear against said bearing surface,
   an oppositely disposed jaw portion, and
   means to draw said clamp member toward said vertex, operably to urge said shoe portion against said bearing surface and said jaw portion toward said bed;
said jaw portion and said bed being adapted to hold therebetween a cutter insert having an obverse face, a reverse face, a plurality of edge portions extending therebetween, and a cutting edge between one of said edge portions and said observe face;
said seat being adapted to bear against another of said cutter insert edge portions in a manner to project said cutting edge beyond said forward wall of said wedge-shaped clamp member; and
said bed being adapted to bear against substantially all of said reverse face when said cutter insert is thus held between said jaw portion and said bed, and said seat bears against said another of said edge portions in a manner to project said cutting edge beyond said forward wall;
a dowel-hole disposed through said upper face of one of said cutting heads, and defining with said longitudinal axis and said seat an angle whose vertex is said axis,
a dowel-hole disposed through said lower face of another of said cutting heads and defining with said longitudinal axis and the seat of said last-mentioned cutting head an angle whose vertex is said axis,
   said last-mentioned angle being non-complementary to said first-mentioned angle with respect to prime divisor of 360°, and
a dowel adapted to be disposed in both of said dowel-holes when said upper and lower faces are adjacent one another and said collar portions are mounted on a spindle which itself is disposed for rotation about said longitudinal axis.

15. A cutting tool as defined in claim 14, and further characterized by:
said cutting arm comprising a second outer edge having a recess related thereto in substantially the same manner as the first-mentioned recess is related to the first-mentioned outer edge;
said forward face extending from said first-mentioned recess substantially to said second outer edge, and being substantially smooth and continuous.

16. A cutting tool as defined in claim 14, and further characterized by:
a yieldable lining disposed on said jaw and adapted to bear against said cutter insert.

17. A cutting tool as defined in claim 14, and further characterized by:
said cutting edge being disposed at a high rake.

References Cited by the Examiner

UNITED STATES PATENTS

| 2,378,094 | 6/1945 | Nunes-Vaz | 29—96 |
| 2,521,868 | 9/1950 | Otto | 29—105 X |
| 2,561,470 | 7/1951 | Hadley | 29—105 X |
| 2,645,844 | 7/1953 | Longe | 29—96 |
| 3,050,828 | 8/1962 | Cashman | 29—96 |

FOREIGN PATENTS

| 874,114 | 8/1961 | Great Britain. |

WILLIAM W. DYER, Jr., *Primary Examiner.*